United States Patent
Cotting et al.

(10) Patent No.: US 9,208,171 B1
(45) Date of Patent: Dec. 8, 2015

(54) GEOGRAPHICALLY LOCATING AND POSING IMAGES IN A LARGE-SCALE IMAGE REPOSITORY AND PROCESSING FRAMEWORK

(71) Applicant: Google Inc., Mountain View, CA (US)

(72) Inventors: Daniel Cotting, Islisberg (CH); Krzysztof Sikora, Lachen (CH); Roland Kehl, Dubendorf (CH); Boris Bluntschli, Zurich (CH); Wojciech Stanislaw Smietanka, Pfaffikon (CH); Martin Stefcek, Pfaffikon (CH)

(73) Assignee: Google Inc., Mountain View, CA (US)

( * ) Notice: Subject to any disclaimer, the term of this patent is extended or adjusted under 35 U.S.C. 154(b) by 33 days.

(21) Appl. No.: 14/018,989

(22) Filed: Sep. 5, 2013

(51) Int. Cl.
G06F 7/00 (2006.01)
G06F 17/30 (2006.01)

(52) U.S. Cl.
CPC ................................ G06F 17/30244 (2013.01)

(58) Field of Classification Search
None
See application file for complete search history.

(56) References Cited

U.S. PATENT DOCUMENTS

| | | | |
|---|---|---|---|
| 5,579,471 A | 11/1996 | Barber et al. | |
| 5,926,116 A | 7/1999 | Kitano et al. | |
| 8,086,048 B2 * | 12/2011 | Naaman et al. | 382/225 |
| 8,131,118 B1 | 3/2012 | Jing et al. | |
| 8,189,925 B2 | 5/2012 | Kroepfl et al. | |
| 8,630,513 B2 * | 1/2014 | Gokturk et al. | 382/305 |
| 2003/0182052 A1 * | 9/2003 | DeLorme et al. | 701/201 |
| 2006/0182430 A1 * | 8/2006 | Stavely et al. | 396/52 |
| 2006/0251338 A1 * | 11/2006 | Gokturk et al. | 382/305 |
| 2007/0047821 A1 * | 3/2007 | Nonaka et al. | 382/224 |
| 2007/0258642 A1 * | 11/2007 | Thota | 382/173 |
| 2008/0133526 A1 * | 6/2008 | Haitani et al. | 707/7 |
| 2009/0254561 A1 * | 10/2009 | Shao et al. | 707/9 |
| 2010/0046842 A1 * | 2/2010 | Conwell | 382/218 |
| 2010/0250341 A1 * | 9/2010 | Hauser | 705/10 |
| 2010/0290699 A1 * | 11/2010 | Adam et al. | 382/155 |
| 2010/0318571 A1 * | 12/2010 | Pearlman et al. | 707/784 |
| 2011/0004692 A1 * | 1/2011 | Occhino et al. | 709/228 |
| 2011/0004831 A1 * | 1/2011 | Steinberg et al. | 715/753 |
| 2011/0021250 A1 * | 1/2011 | Ickman et al. | 455/566 |
| 2011/0044543 A1 | 2/2011 | Nakamura et al. | |
| 2011/0113041 A1 * | 5/2011 | Hawthorne et al. | 707/749 |

(Continued)

OTHER PUBLICATIONS

Toyama et al. Geographic Location Tags on Digital Images, Nov. 2003, Microsoft Research, 156-165.*
Hauff et al., Geo-Location Estimation of Flickr Images: Social Web Based Enrichment, 2012.*

(Continued)

*Primary Examiner* — Neveen Abel Jalil
*Assistant Examiner* — Karina Levitian
(74) *Attorney, Agent, or Firm* — Lerner, David, Littenberg, Krumholz & Mentlik, LLP

(57) ABSTRACT

Aspects of the disclosure relate generally to systems and methods for geographically locating images. For example, images from different sources may be associated with different types of location information or simply none at all. In order to reduce inconsistency among images, location information may be gathered for an image using bitmap processing, metadata processing, and information retrieved from where the image was found. This location information can be filtered to remove less reliable or conflicting information. Images may be clustered based on their appearance on an interactive online resource that corresponds to a user-defined event, based on image similarity, and by their appearance in a user photo album. The location information of the images of a cluster is then copied to all of the other images of that cluster.

20 Claims, 5 Drawing Sheets

(56) References Cited

U.S. PATENT DOCUMENTS

| | | | |
|---|---|---|---|
| 2011/0129153 A1* | 6/2011 | Petrou et al. | 382/182 |
| 2011/0211737 A1* | 9/2011 | Krupka et al. | 382/118 |
| 2012/0036132 A1 | 2/2012 | Doyle | |
| 2012/0072428 A1* | 3/2012 | Kao et al. | 707/748 |
| 2012/0079004 A1* | 3/2012 | Herman | 709/203 |
| 2012/0086544 A1* | 4/2012 | Kemp | 340/5.1 |
| 2012/0213404 A1* | 8/2012 | Steiner | 382/103 |
| 2012/0233000 A1* | 9/2012 | Fisher et al. | 705/14.71 |
| 2012/0233191 A1* | 9/2012 | Ramanujam | 707/758 |
| 2013/0063613 A1 | 3/2013 | Conwell | |
| 2013/0066872 A1* | 3/2013 | Moritz et al. | 707/737 |
| 2013/0148882 A1* | 6/2013 | Lee | 382/164 |
| 2013/0159127 A1* | 6/2013 | Myslinski | 705/26.1 |
| 2013/0191725 A1* | 7/2013 | Meadow et al. | 715/234 |

OTHER PUBLICATIONS

Epshtein et al., Hierarchical Photo Organization using Geo-Relevance, 2007.*

Newsam, Crowdsourcing What is Where: Community-Contributed Photos as Volunteered Geographic Information, 2010.*

"Digital Photography Review DPREVIEW", [online], <www.dpreview.com/forums/post/50196896>, Dec. 2012, 2 pages.

"How to Use Events on Google Plus", [online], <www.wikihow.com/Use-Events-on-Google-Plus>, May 20, 2013, 6 pages.

Dhiraj Joshi, Andrew Gallagher, Jie Yu, and Jiebo Luo, Inferring Photographic Location Using Geotagged Web Images, Jul. 16, 2010, 23 pages.

Markus Brenner and Ebroul Izquierdo, Social Event Detection and Retrieval in Collaborative Photo Collections, Jun. 5-8, 2012, 8 pages.

* cited by examiner

300

GEOGRAPHICALLY LOCATING AND POSING IMAGES IN A LARGE-SCALE IMAGE REPOSITORY AND PROCESSING FRAMEWORK

BACKGROUND

Various systems use geographic location information to enhance the usefulness of various media such as images, videos, websites, SMS messages, etc. This may include adding, assigning or associating metadata with the media. The metadata may include information such as location coordinates (such as latitude and longitude), street addresses, web addresses (such as URLS), place names, or other location identifiers. In order to generate this location information, these systems may determine location coordinates from other geographic data such as street addresses or zip codes.

SUMMARY

One aspect of the disclosure provides a method. The method includes receiving a first image associated with an identifier; using the identifier, locating an interactive online resource that corresponds to a user-defined event, the interactive online resource allowing different users to upload images related to the user defined event; for the first image, generating a first set of location data based on at least one of information found at the interactive online resource, metadata of the first image, and a feature depicted in the first image; generating, by a processor, a cluster of images that are all associated with the identifier, the cluster including at least the first image and one other image, wherein the one other image is associated with a second set of location data; combining the first set of location data and the second set of location data into a third set of location data; and assigning the third set of location data to each image of the cluster of images.

In one example, the method also includes filtering the first set of location data based on sources for the location data of the first set of location data. In another example, the method also includes filtering the first set of location data to remove conflicting location data. In another example, the method also includes ranking the third set of location data based on reliability of sources of the third set of location data and filtering the third set of location data based on the rankings. In another example, the method also includes filtering the third set of location data to remove conflicting location data. In another example, the method also includes identifying conflicting location data of the third set of location data and merging the conflicting location data into new non-conflicting location data. In another example, the method also includes identifying a second image that is from a uniform resource locator (URL) different from a first URL of the interactive online resource and that is identical to the first image, and wherein the first set of location data is generated based on information found at the second URL. In another example, the clustered images are a first cluster of images and the method also includes generating a second cluster of images based on whether images are included in a same user defined album of images such that the second cluster of images includes the first image, but not the one other image and assigning the third set of location data to each image of the second cluster of images. In another example, the interactive online resource is a web page and the identifier is a uniform resource locator (URL).

In another example, the clustered images are a first cluster of images and the method also includes generating a second cluster of images based on whether images meet a threshold level of similarity such that the second cluster of images includes the first image, but not the one other image and assigning the third set of location data to each image of the second cluster of images. In this example, the second cluster of images includes a third image associated with a fourth set of location data, and the method also includes assigning the fourth set of location data to the images of the second cluster such that the first and third images are associated with both the third set of location data and the fourth set of location data and the one other image is associated with the third set of location data.

Another aspect of the disclosure provides a system. The system includes memory storing a first image associated with an identifier and one other image. The system also includes a processor configured to use the identifier, locating an interactive online resource that corresponds to a user-defined event, the interactive online resource allowing different users to upload images related to the user defined event; for the first image, generate a first set of location data based on at least one of information found at the interactive online resource, metadata of the first image, and a feature depicted in the first image; generate a cluster of images that are all associated with the identifier, the cluster including at least the first image and the one other image, wherein the one other image is associated with a second set of location data; combine the first set of location data and the second set of location data into a third set of location data; and assign the third set of location data to each image of the cluster of images.

In one example, the processor is also configured to filter the first set of location data based on sources for the location data of the first set of location data. In another example, the processor is also configured to filtering the first set of location data to remove conflicting location data. In another example, the processor is also configured to rank the third set of location data based on reliability of sources of the third set of location data and filter the third set of location data based on the rankings. In another example, the processor is also configured to filtering the third set of location data to remove conflicting location data. In another example, the processor is also configured to identify conflicting location data of the third set of location data and merge the conflicting location data into new non-conflicting location data. In another example, the clustered images are a first cluster of images and the processor is also configured to generate a second cluster of images based on whether images are included in a same user defined album of images such that the second cluster of images includes the first image, but not the one other image and assign the third set of location data to each image of the second cluster of images.

In another example, the processor is also configured to identify a second image that is from a uniform resource locator (URL) different from a first URL of the interactive online resource and that is identical to the first image, and wherein the first set of location data is generated based on information found at the second URL. In this example, the clustered images are a first cluster of images and the processor is also configured to generate a second cluster of images based on whether images meet a threshold level of similarity such that the second cluster of images includes the first image, but not the one other image and assign the third set of location data to each image of the second cluster of images.

DETAILED DESCRIPTION

Geographically located and, in some examples, camera posed images can serve as a basis to learn and model the world, to enable new and better use cases for user facing image products. Thus, generating more and better location information is important. The aspects described herein including geographically locating and posing images may be used in a large-scale repository to significantly increase the number and precision of geographically located images. Besides increasing the photo coverage in image content providing products, the increased quantity and density of data provided by the features described herein can enable the creation of better databases for vision algorithms (e.g., for landmark detection), or new image experiences.

Overview

As an example, images from different sources may be associated with different types of location information or simply none at all. In order to reduce inconsistency among images, location information may be gathered for an image using bitmap processing (detecting objects in an image), metadata processing, and information from URLs where the image was found. This location information can be filtered to remove less reliable or conflicting location information. For example, the reliability of information can be determined based on the source of the location information or the image. In some examples, the conflicting location information can be merged together to eliminate conflicts.

Images may then be clustered based on their appearance on an interactive online resource that corresponds to a user-defined event. Other clustering techniques may also be used such as clustering based on image similarity and by user photo albums. In addition, the same image may be included in multiple clusters. The location information of the images of a cluster is then "smeared" or copied to one or more other applicable images in that cluster. See below for discussion of times and images where, in some embodiments, smearing does and does not occur. The smeared location information may be filtered again to remove less reliable or conflicting location information.

Example Methods

Figure 1A:
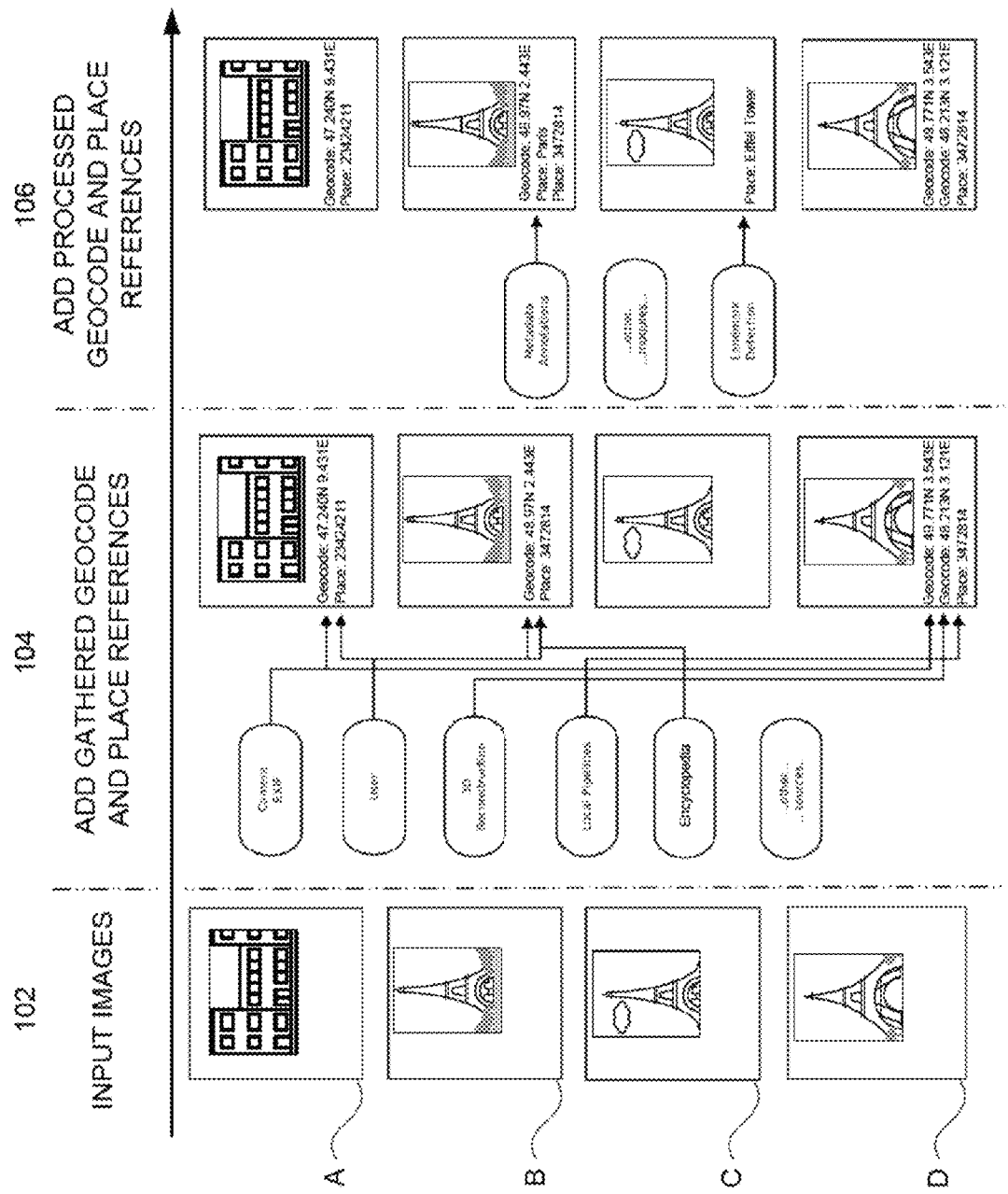
FIGS. 1A and 1B are an example flow diagram in accordance with aspects of the disclosure.
Figure 1B:
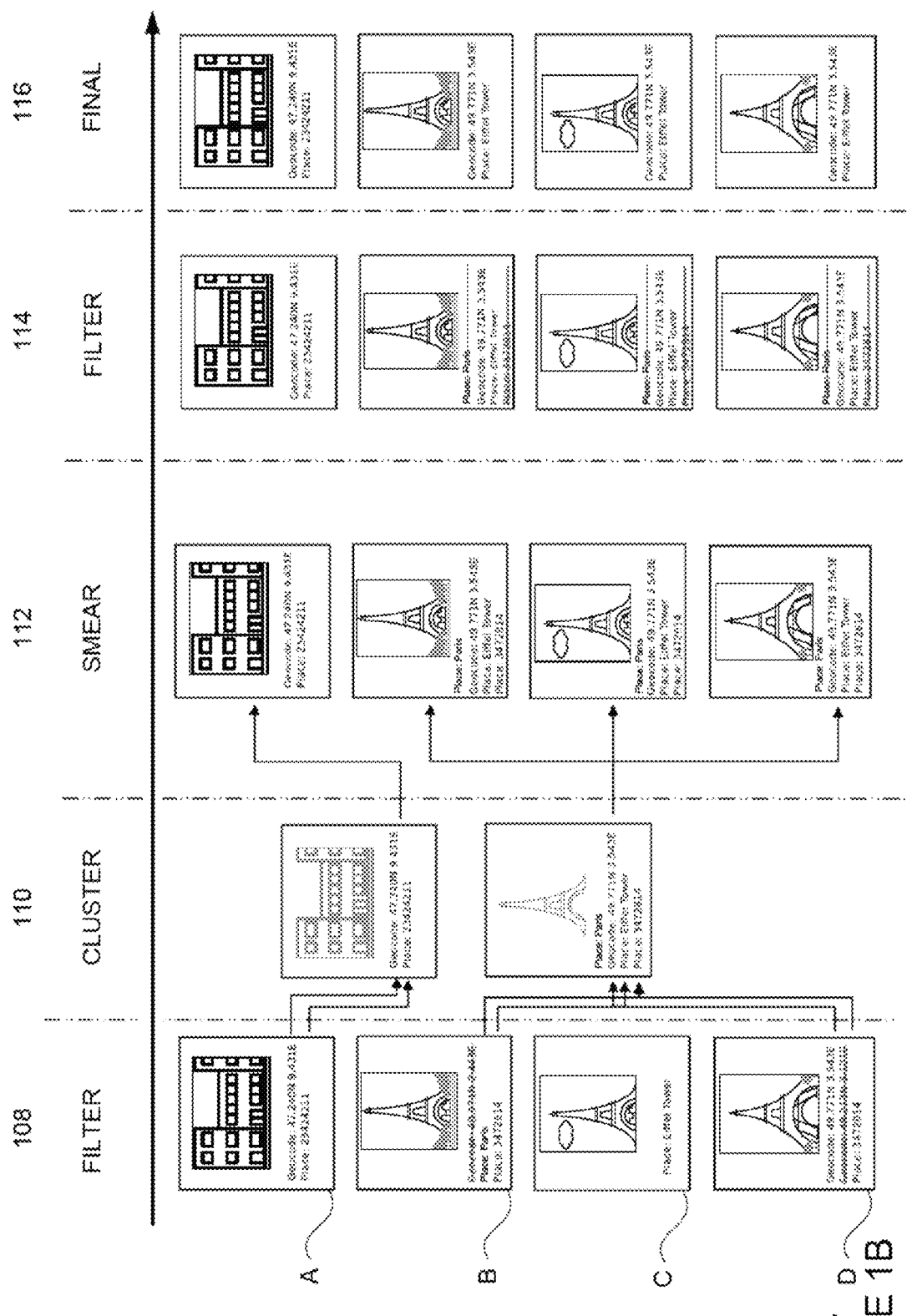

In one aspect, images may be selected for processing. FIGS. 1A and 1B are an example flow diagram 100 of some of the aspects described herein. In this example, at column 102, images A-D are input into a server, such as server 310 described with regard to FIGS. 3 and 4 below.

Location information may be generated for the images. In this regard, the server may generate a list or set of location data for each image. The location data may include any information related to location such as location coordinates (latitude, longitude, altitude), names of places on a map (such as cities, states, countries), street addresses, names of businesses, names of monuments (such as the Eiffel Tower or Empire State Building), a position combined with camera extrinsic (orientation and heading) and/or intrinsic information (lens and projection parameters), and/or location codes or identifiers representing businesses, places, POI, or other types of location.

This location information may be designated into different groups. As an example, the location information may be classified or otherwise identified as geographic location ("geolocation") coordinates and place references. Geolocation coordinates may include, among other things, coordinates identifying a specific point on Earth or on a map such as latitude and longitude coordinates or some other reference system. In some examples, geolocation coordinates may also include altitude and/or precision information. Place references may include, among other things, an assignment to a specific geographic feature such as a restaurant, monument, city, country, etc.

The set of location data may be gathered from multiple sources. For example, at column 104 of FIG. 1A, geolocation coordinates ("geocode" in FIGS. 1A and 1B) and place references ("place" in FIGS. 1A and 1B) are added to images A, B, and D from a number of different sources. As shown at column 104, these sources may include data from the exchangeable image file format (Exif) from a camera that captured the image, user provided information such as annotations or other tags, 3D reconstructions such as where a photo is matched to a 3D model of an object or portion of the word that was constructed using other images, local pipelines such as where a user uploads an image to a web page associated with a business or where images from licensed or crawled feeds are matched to businesses and POIs based on metadata in the feeds, data from source URLs, explicit location information from the meta data (such as location coordinates, an address, or the location codes described above) and various other sources.

As an example, there may be many different copies of the same (identical) image from different URLs (and even different domains) on the web. Any URLs pointing to the same image or bitmap data may be grouped together. Information such as text at these URLs may be reviewed to identify location data which is then gathered and included in the set of location data. For example, if an image URL includes a web page describing a business, the name of the business, business's address, or other information may be retrieved from the URL and included in the set of location data as a place reference or geolocation coordinates for that image. In the example of image B, the image may be associated with an encyclopedia web page identifying latitude and longitude coordinates as well as a location code for the Eiffel Tower. Thus, this information may be included as geolocation coordinates and a place reference in the location information for image B.

In addition to gathering information from different sources, the images themselves as well as the metadata associated with the images may be processed to identify additional location information. Processing the metadata may include extraction of geographic information from the image's title, description, tags, albums etc. For example, at column 106 of FIG. 1A, additional place references are added to the sets of location data for images B and C. In this example, image B may be associated with metadata such as a user annotation including the text "We had such a lovely time in Paris." In column 110, the server may recognize the word "Paris" as a place reference and add it to the set of location data for image B. Although not shown, additional geolocation coordinates may also be identified from the metadata and added to the location data.

As noted above, the image or bitmaps themselves can also be processed to identify features such as landmarks, Points of Interest (POI), monuments, location details from signs, famous buildings, entities, etc. This information may also be included in the set of location data for an image. In the example of FIG. 1A, the server may also process the bitmap of image C using a computer vision, image matching, or other pattern recognition algorithm and detect the Eiffel Tower.

This information may also be included as a place reference in the set of location data for image C as shown in column 306.

The set of location data for each image may also be filtered to remove less reliable or conflicting location information. In this regard, the server can keep the "best" or presumably the most accurate set of location data for each image. For example, the reliability of information can be determined based on the source of the location information and/or the source of the image as discussed with regard to image storage system 340 below. For example, sources of geolocation coordinates, in addition to those that are associated with an image may include geolocation coordinates extracted from user provided annotations, geolocation coordinates extracted from Exif metadata of images, geolocation coordinates extracted from image search sitemaps, geolocation coordinates interpolated from metadata or by other processing methods, geolocation coordinates extracted from user check-ins on social media web sites, geolocation coordinates extracted from user defined event data (described in more detail below), geolocation coordinates derived from website content, geolocation coordinates derived from knowledge graph entities using a visual search service etc. For example, sources of place references, may include place references extracted from user provided annotations, place references derived from associations of photos with places on a map or in an index, place references derived from detection of features (POI, monuments, landmarks, etc.) in an image, place references extracted from user check-ins on social media web sites, place references extracted from user defined event data, place references derived from metadata, place references derived from website content, place references derived from knowledge graph entities using a visual search service, etc.

In one example, the sources of the location data may be ranked by reliability from high to low. Those with higher reliability ranking may be considered more reliable than those with a lower reliability ranking. In another example, each source of the location data may be associated with a reliability value such as on a scale from 1 to 10 or 0 to 1. As an example, sources such as user provided location coordinates may be considered more reliable and thus be ranked higher or have a greater reliability value than geolocation coordinates gathered from URLs, though the reverse may also be applicable.

The geolocation coordinates and place references of the set of location data may also be filtered independently. For example, the server may rank the geolocation coordinates of the set of location data separately from the place references. As an example, for all geolocation coordinates in a set of location data, the geolocation coordinates with the highest precision that contains all of the other geolocation coordinates of the set of location data within its precision radius may be selected as representative geolocation coordinates for the image, such as a single combination of latitude, longitude, altitude, and precision. If unspecified, the precision radius may be a fixed value such as 20 km. All other geolocation coordinates may be filtered or otherwise removed from the set of location data.

In order to select the representative geolocation coordinates, the server may select the geolocation coordinates of the set of location data with the highest reliability value or highest ranked source. The server may then iterate through all the lower valued or ranked geolocation coordinates and update the representative geolocation coordinates whenever a lower value or ranked geolocation coordinates has a better accuracy and is covered by the radius of the previous representative geolocation coordinates so far. In some examples, geolocation coordinates around the origin or the latitude, longitude coordinates (0,0), and the North and South Poles are not considered during the computation.

With regard to place references, the sources may be ranked or valued as described with regard to the geolocation coordinates. The highest ranked or valued place reference may be selected as a representative place reference. As an example, place references derived from user annotations in metadata may be considered less reliable and thus be ranked lower or have a lesser reliability value than place references determined from processing the bitmap of an image, though the reverse may also be applicable. If two place references have an equal score, the most recent item may be preferred.

In the example of FIG. 1B, location data of images B and D is filtered at column 108. In the example of image B, the geolocation coordinates 48.91N 2.443E may be filtered or removed from the set of location data for image B because those geolocation coordinates are inconsistent with the location place reference Paris and/or the place reference location code 3472814. However, it may also be useful to simply remove all conflicting location data. In the example of image D, the geolocation coordinates 48.213N 3.121E may be filtered or removed from the set of location data for image B because those geolocation coordinates are from a less reliable source (as described above) than the geolocation coordinates 49.771N 3.543E.

The images, and corresponding sets of location data, may then be clustered together. The clustering may be based on near duplicate image fingerprints (for example nearly identical image identifiers, bitmaps, etc.), common assignments to an album or a user defined event (described in more detail below), and common textual metadata. For example, the server may assume that images with close timestamps in the same album or associated with the same user defined event are likely to be associated with the same location. For example, as shown in column 110 of FIG. 1B, images B, C, and D, having near duplicate image fingerprints, are clustered together. These images may be compared pixel by pixel to determine if they meet a threshold similarly value. If so, the images may be clustered together. Image A may also be clustered together with other images based on a common user defined event identifier or some other clustering technique.

The sets of location data of the images of a cluster may then be "smeared" or copied to one or more of the other images of that cluster. However, before this smearing takes place users may be given the opportunity to prevent or limit this processing by including a time limit on the use and dissemination of their images. Similarly, if a user wants to share images privately, or only with a particular set of users, such images may be excluded from this location smearing entirely.

As an example of this location smearing, the sets of location data for each of the images of the clusters are combined into a new set of location data. At column 112 of FIG. 1B, images B, C, and D are clustered together, and thus, the sets of location data for each image are copied to each of the other images in the cluster. In particular, the place reference Eiffel Tower of image C is copied to the location data of both images B and D. In addition, the place reference location code 3472814 of images B and D is copied to the location data of image C. In this example, the smeared set of location data is also de-duplicated in the smearing step, though this may also be a separate step or part of the filtering of column 114.

As noted above, the smeared location data may be filtered again to remove less reliable or conflicting location information as described above. In addition, the server may consider whether the source of the geolocation coordinates or place reference was a smearing from another image as well as the type of clustering used. As noted above, these may also be ranked or valued in order to select a representative geolocation coordinates and/or place reference. For example, at column 114, the place reference Paris and the place reference location code 3472814 are filtered from the smeared set of location data to produce a final set of location data for the images shown at column 116. In the example of image A, however, there is only a single set of geolocation coordinates and a single place reference are included in smeared set of location data, so no filtering is necessary.

Figure 4:
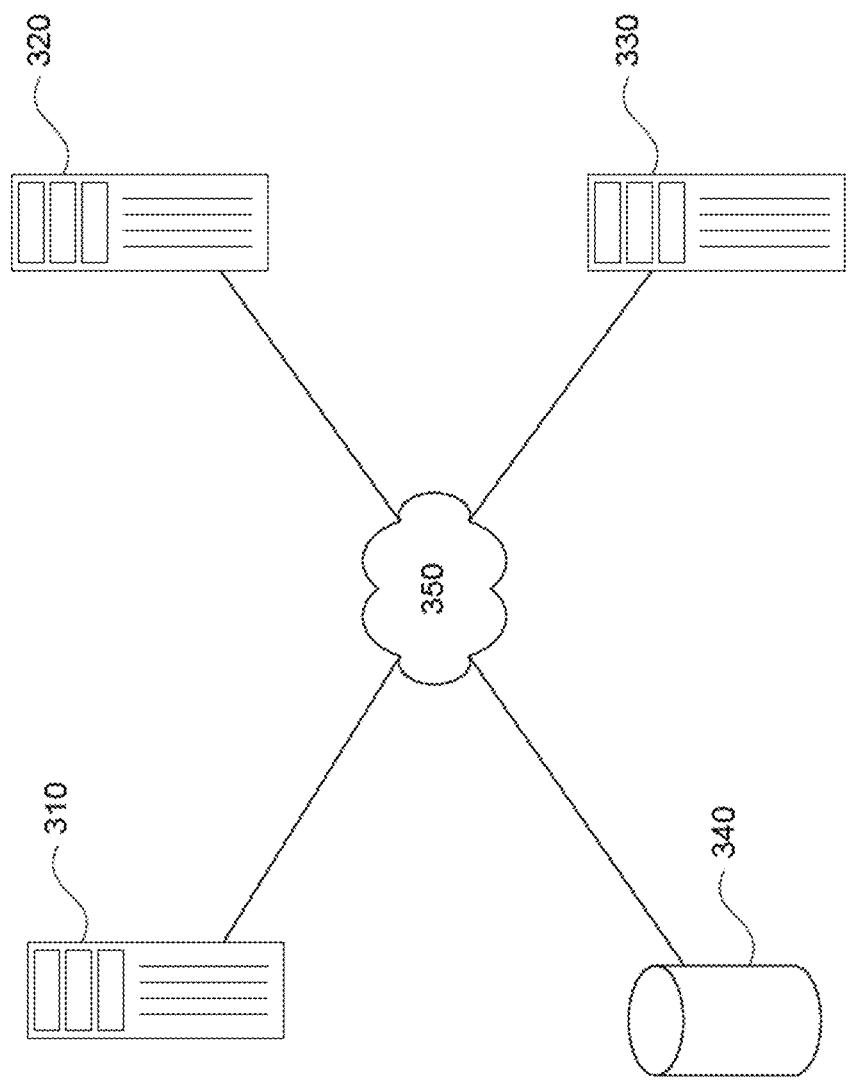
FIG. 4 is a pictorial diagram of the system of FIG. 2.

FIG. 4 is an example flow diagram of some of the aspects described herein that may be performed at least in part by the server. In this example, the computer receives a first image associated with an identifier at block 202. Using the identifier, the computer locates an interactive online resource that corresponds to a user-defined event at block 204. As noted above, the interactive online resource allowing different users to upload images related to the user defined event. For the first image, the computer generates first set of location data based on at least one of information found at the interactive online resource, metadata of the first image, and a feature depicted in the first image at block 206. The computer generates a cluster of images based on whether the clustered images are associated with the identifier, the cluster including at least the first image and one other image uploaded by a user, wherein the one other image is associated with a second set of location data at block 208. The computer smears the sets of location data for the cluster by combining the first set of location data and the second set of location data into a third set of location data at block 210 and assigning the third set of location data to each image of the cluster of images at block 212.

In some aspects, the same image may be included in multiple clusters. For example, images may be clustered iteratively. Thus over time, location data for different images may be changed or improved. As an example, consider images X, Y, and Z. Images X and Y may be clustered together based on a common user defined event identifier. Image X may receive location data from image Y in the smearing process. Later, images Z and Y may be clustered together based upon near duplicate image fingerprints. Location data from image Y may then be smeared to image Z. In this regard, image Z may never be clustered with image X, but may indirectly receive location data from image X. Again, as the location data is filtered several times, image Z may not actually receive any location data from image X, despite the multiple smearings.

In some examples, rather than being filtered or removed, conflicting location data can be merged together to eliminate conflicts. For example, if a first place reference describes a first city and a second place reference describes a second city, these two areas may be combined so that the resulting place reference includes both cities.

In addition to geolocation coordinates and place references, the server may also include camera pose information in the sets of location data. For example, camera pose may include the position of the camera that captured the image in latitude, longitude, and altitude (or other coordinate systems) as well as the errors (and/or standard deviations) for these measurements. The camera pose may also include the orientation of the camera such as the rotation in degrees around forward vector, the rotation in degrees around right vector, the compass direction of the camera in degrees (the yaw angle), the reference for the compass direction (true north, or magnetic), as well as the sources and errors for these measurements. The camera pose may also include camera parameters such as the principal point or intersection of the optical axis and the image plane (in pixels), the focal length of the camera, as well as the image size in pixels when this camera pose was created (this is because the principal point is in pixels and it may be useful to hold pixels based data rather than relative). Other camera features such as radial distortion may also be included.

Camera pose information may also be filtered as with the geolocation coordinates and place references described above. For example, camera pose may be gathered from sources such as information associated with user provided images, user generated content, Exif information from the camera itself, computed from geolocation coordinates (for example, if the best camera pose for an image had no heading information then the yaw may be computed from the camera geolocation coordinates and the target geolocation coordinates using true north as a reference), and/or data gathered from duplicate or near duplicate images. Again, each of these sources may be associated with a reliability value or ranked based upon the reliability of the source. For example, information associated with user provided images and user generated content may be ranked the same, but above Exif information from the camera itself. Exif information may also be ranked above computations from geolocation coordinates. And the computations may be ranked above data gathered from duplicate or near duplicate images.

Example System

Figure 3:
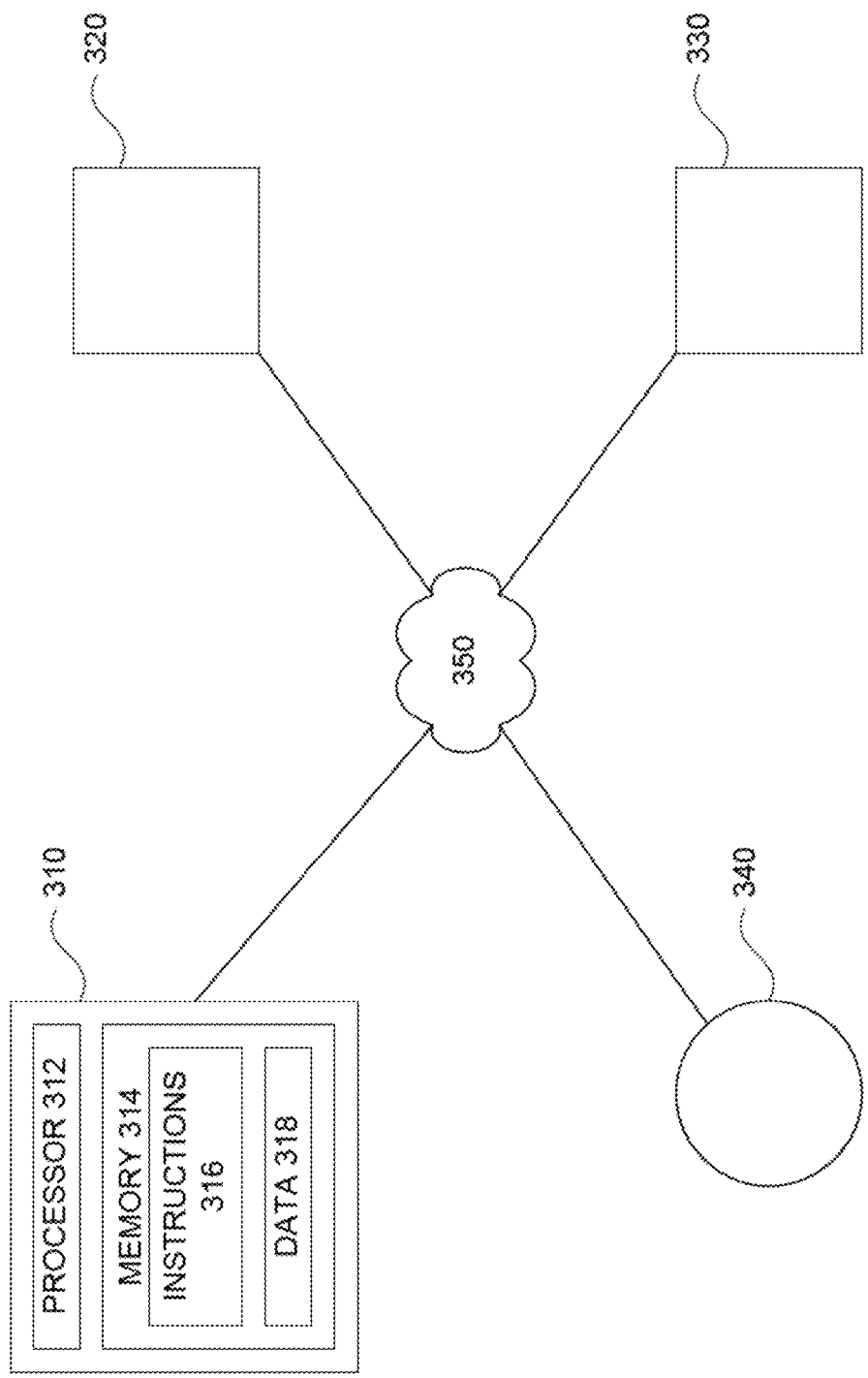
FIG. 3 is a functional diagram of a system in accordance with aspects of the disclosure.

As shown in FIGS. 3-4, a geographically locating system 300 is an example system in which the geographically locating features described above may be implemented. It should not be considered as limiting the scope of the disclosure or usefulness of the features described herein.

In this example, system 300 can include computing devices 310, 320, and 330 as well as storage system 340. Computing device 310 can contain a processor 312, memory 314 and other components typically present in general purpose computers. Memory 314 of computing device 310 can store information accessible by processor 312, including instructions 316 that can be executed by the processor 312.

Memory can also include data 318 that can be retrieved, manipulated or stored by the processor. The memory can be of any type capable of storing information accessible by the processor, such as a hard-drive, memory card, ROM, RAM, DVD, CD-ROM, write-capable, and read-only memories.

The instructions 316 can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computer language including scripts or collections of independent source code modules that are interpreted on demand or compiled in advance. Functions, methods and routines of the instructions are explained in more detail below.

Data 318 can be retrieved, stored or modified by processor 312 in accordance with the instructions 316. For instance, although the subject matter described herein is not limited by any particular data structure, the data can be stored in computer registers, in a relational database as a table having many different fields and records, or XML documents. The data can also be formatted in any computer-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The processor 312 can be any conventional processor, such as commercially available CPUs. Alternatively, the processor can be a dedicated device such as an ASIC or other hardware-based processor. Although FIG. 3 functionally illustrates the processor, memory, and other elements of computing device 310 as being within the same block, the processor, computing device, or memory can actually comprise multiple processors, computing devices, or memories that can or cannot be stored within the same physical housing. For example, memory can be a hard drive or other storage media located in a housing different from that of computing device 310. Accordingly, references to a processor, computer, computing device, or memory will be understood to include references to a collection of processors, computers, computing devices, or memories that can or cannot operate in parallel.

The computing device 310 can be at one node of a network 350 and capable of directly and indirectly communicating with other nodes, such as computers 320 and 330 as well as storage system 340, of the network. The network 350 and intervening nodes described herein, can be interconnected using various protocols and systems, such that each can be part of the Internet, World Wide Web, specific intranets, wide area networks, or local networks. These can use standard communications protocols or those proprietary to one or more companies, Ethernet, WiFi and HTTP, and various combinations of the foregoing.

Each of computing devices 320 and 330 can be configured similarly to the computing device 310, with a processor, memory, instructions, and data, similar to processor 312, memory 314, instructions 316, and data 318. For example, computing devices 320 and/or 330 may be web servers that exchange information with different nodes of network 350 for the purpose of receiving, processing and transmitting data to end user or client devices (not shown). In this instance, the client devices will typically still be at different nodes of the network than any of the computing devices of servers 310, 320, or 330.

Although FIGS. 3 and 4 depict computing devices (or servers) 310, 320 and 330 and storage system 340 as singular devices, these devices may each represent many computers. For example, each of servers 310, 320 or 330 may also include many computing devices, e.g., a load balanced server farm.

Figure 2:
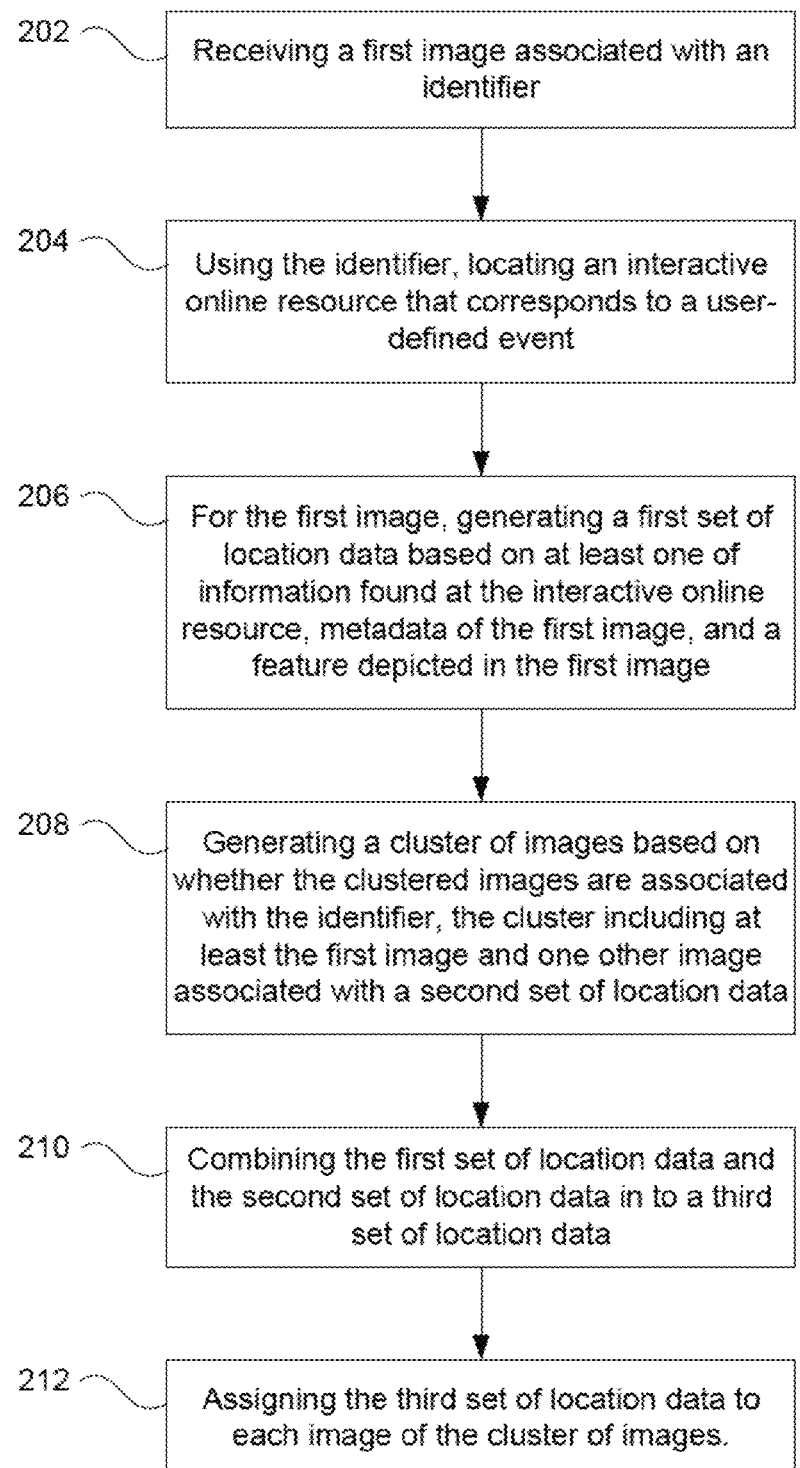
FIG. 2 is another example flow diagram in accordance with aspects of the disclosure.

Storage system 340 may store images. These images may be retrieved or collected from various sources. As an example, computing devices 320 and 330 may be considered image sources or network locations from which images of storage system 340 are collected. An image may be collected from any suitable source that has granted the system (and/or the general public) rights to access and use the image. These images may be retrieved or otherwise accessed by a server, such as the server 110 depicted as performing the items in column 110, in order to perform some or all of the features described above, for example, with regard to FIGS. 1A, 1B, and 2.

In situations in which the systems discussed here collect personal images or information about users, or may make use of personal information, the users may be provided with an opportunity to control whether programs or features collect user information (e.g., information about a user's social network, social actions or activities, profession, a user's preferences, or a user's current location), or to control whether and/or how user information is used by the system. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how and what information is collected about the user and used by computers 310, 320, or 330.

Users may also be provided with an opportunity to control whether their own images are processed in accordance with the techniques described herein. For example, the user may include a time limit on the use and dissemination of their images. Similarly, if a user wants to share images privately, or only with a particular set of users, such images may be excluded from dissemination at all, or from dissemination to any but those designated. In addition, users may designate or identify particular ones of their own images for which they would like to allow the processing described above.

In addition to pixel data, images of the image storage system may be associated with various types of information. This may include metadata or other information identifying the source of an image (URLs, etc.), information assigned by the camera that captured the image (such as location coordinates or pose), information provided by one or more users, and various identifiers. These identifiers may include codes describing what is in the image, whether the image is or was associated with a user defined event or included in a user's album, and/or a unique identifier for the image. Some images may be associated with all, some, or none of the aforementioned information.

In one example, an image may be retrieved from interactive online resource that allows different users to upload images related to a user defined event as discussed above. For example, some online systems, allow a user to designate a web location for an event. The event can be defined by the user, for example, and may relate to an event that has, will, or is occurring at a particular location, date, and time. Examples of such events may include meetings, concerts, parties, athletic events, etc. However, as these events are user defined, the events may also be associated with a user's personal interest such as music, sports, etc. Other users may then upload information such as images, video, or text to the web location. This user defined event data may then be associated with an identifier, as discussed above, such as a URL or encoded value, indicating that the information is somehow associated with the event.

Although certain advantages are obtained when information is transmitted or received as noted above, other aspects of the subject matter described herein are not limited to any particular manner of transmission of information. Yet further, although some functions are indicated as taking place on a single computer having a single processor, various aspects of the subject matter described herein can be implemented by a multiple of computers, for example, communicating information over network 350.

As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described below. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
   receiving, by one or more computing devices, a first image associated with an identifier;
   using, by the one or more computing devices, the identifier, locating an interactive online resource that corresponds to a user-defined event, the interactive online resource allowing different users to upload images related to the user defined event;
   identifying a second image that is from a uniform resource locator (URL) different from a first URL of the interactive online resource and that is identical to the first image;
   for the first image, generating, by the one or more computing devices, a first set of location data based on at least information found at the second URL;
   generating, by the one or more computing devices, a cluster of images that are all associated with the identifier, the cluster including at least the first image and one other image, wherein the one other image is associated with a second set of location data;
   identifying, by the one or more computing devices, a source of each location data in the first set of location data and the second set of location data;
   determining, by the one or more computing devices, a reliability level of each source wherein the reliability level of each source comprises assigning a value to each source;
   ranking, by the one or more computing devices, each of the location data according to the reliability level;
   filtering, by the one or more computing devices, the first set of location data and the second set of location data based on the rankings to create a filtered first set of location data and a filtered second set of location data;
   combining, by the one or more computing devices, the filtered first set of location data and the filtered second set of location data into a third set of location data; and
   assigning, by the one or more computing devices, the third set of location data to each image of the cluster of images, such that the first image receives at least the filtered second set of location data associated with the one other image and the one other image receives at least the filtered first set of location data associated with the first image.

2. The method of claim 1, further comprising filtering the first set of location data based on sources for the location data of the first set of location data.

3. The method of claim 1, further comprising filtering the first set of location data to remove conflicting location data.

4. The method of claim 1, further comprising:
   ranking the third set of location data based on reliability of sources of the third set of location data; and
   filtering the third set of location data based on the rankings.

5. The method of claim 1, further comprising filtering the third set of location data to remove conflicting location data.

6. The method of claim 1, further comprising:
   identifying conflicting location data of the third set of location data; and
   merging the conflicting location data into new non-conflicting location data.

7. The method of claim 1 wherein determining the reliability level of each source comprises assigning the value to each source such that user-provided coordinates are ranked higher than sources comprising location data found at a URL.

8. The method of claim 1, wherein the clustered images are a first cluster of images and the method further comprises:
   generating a second cluster of images based on whether images meet a threshold level of similarity such that the second cluster of images includes the first image, but not the one other image; and
   assigning the third set of location data to each image of the second cluster of images.

9. The method of claim 8, wherein the second cluster of images includes a third image associated with a fourth set of location data and the method further comprises assigning the fourth set of location data to the images of the second cluster such that the first and third images are associated with both the third set of location data and the fourth set of location data and the one other image is associated with the third set of location data.

10. The method of claim 1, wherein the clustered images are a first cluster of images and the method further comprises:
    generating a second cluster of images based on whether images are included in a same user defined album of images such that the second cluster of images includes the first image, but not the one other image; and
    assigning the third set of location data to each image of the second cluster of images.

11. The method of claim 1, wherein the interactive online resource is a web page and the identifier is a uniform resource locator (URL).

12. A system comprising:
    memory storing a first image associated with an identifier and one other image; one or more computing devices configured to: use the identifier, locating an interactive online resource that corresponds to a user-defined event, the interactive online resource allowing different users to upload images related to the user defined event;
    identifying a second image that is from a uniform resource locator (URL) different from a first URL of the interactive online resource and that is identical to the first image;
    for the first image, generate a first set of location data based on at least information found at the second URL;
    generate a cluster of images that are all associated with the identifier, the cluster including at least the first image and the one other image, wherein the one other image is associated with a second set of location data;
    identify a source of each location data in the first set of location data and the second set of location data;
    determine a reliability level of each source wherein the reliability level of each source comprises assigning a value to each source;
    rank each of the location data according to the reliability level;
    filter the first set of location data and the second set of location data based on the rankings to create a filtered first set of location data and a filtered second set of location data;
    combine the filtered first set of location data and the filtered second set of location data into a third set of location data; and
    assign the third set of location data to each image of the cluster of images, such that the first image receives at least the filtered second set of location data associated with the one other image and the one other image receives at least the filtered first set of location data associated with the first image.

13. The system of claim 12, wherein the one or more computing devices are further configured to filter the first set of location data based on sources for the location data of the first set of location data.

14. The system of claim 12, wherein the one or more computing devices are further configured to filtering the first set of location data to remove conflicting location data.

15. The system of claim 12, wherein the one or more computing devices are further configured to:
    rank the third set of location data based on reliability of sources of the third set of location data; and
    filter the third set of location data based on the rankings.

16. The system of claim 12, wherein the processor is further configured to filtering the third set of location data to remove conflicting location data.

17. The system of claim 12, wherein one or more computing devices are further configured to:
    identify conflicting location data of the third set of location data; and
    merge the conflicting location data into new non-conflicting location data.

18. The system of claim 12 wherein determining the reliability level of each source comprises assigning the value to each source such that user-provided coordinates are ranked higher than sources comprising location data found at a URL.

19. The system of claim 12, wherein the clustered images are a first cluster of images and the one or more computing devices are further configured to:
    generate a second cluster of images based on whether images meet a threshold level of similarity such that the second cluster of images includes the first image, but not the one other image; and
    assign the third set of location data to each image of the second cluster of images.

20. The system of claim 12, wherein the clustered images are a first cluster of images, and the one or more computing devices are further configured to:
    generate a second cluster of images based on whether images are included in a same user defined album of images such that the second cluster of images includes the first image, but not the one other image; and
    assign the third set of location data to each image of the second cluster of images.

\* \* \* \* \*